United States Patent Office 3,302,880
Patented Feb. 7, 1967

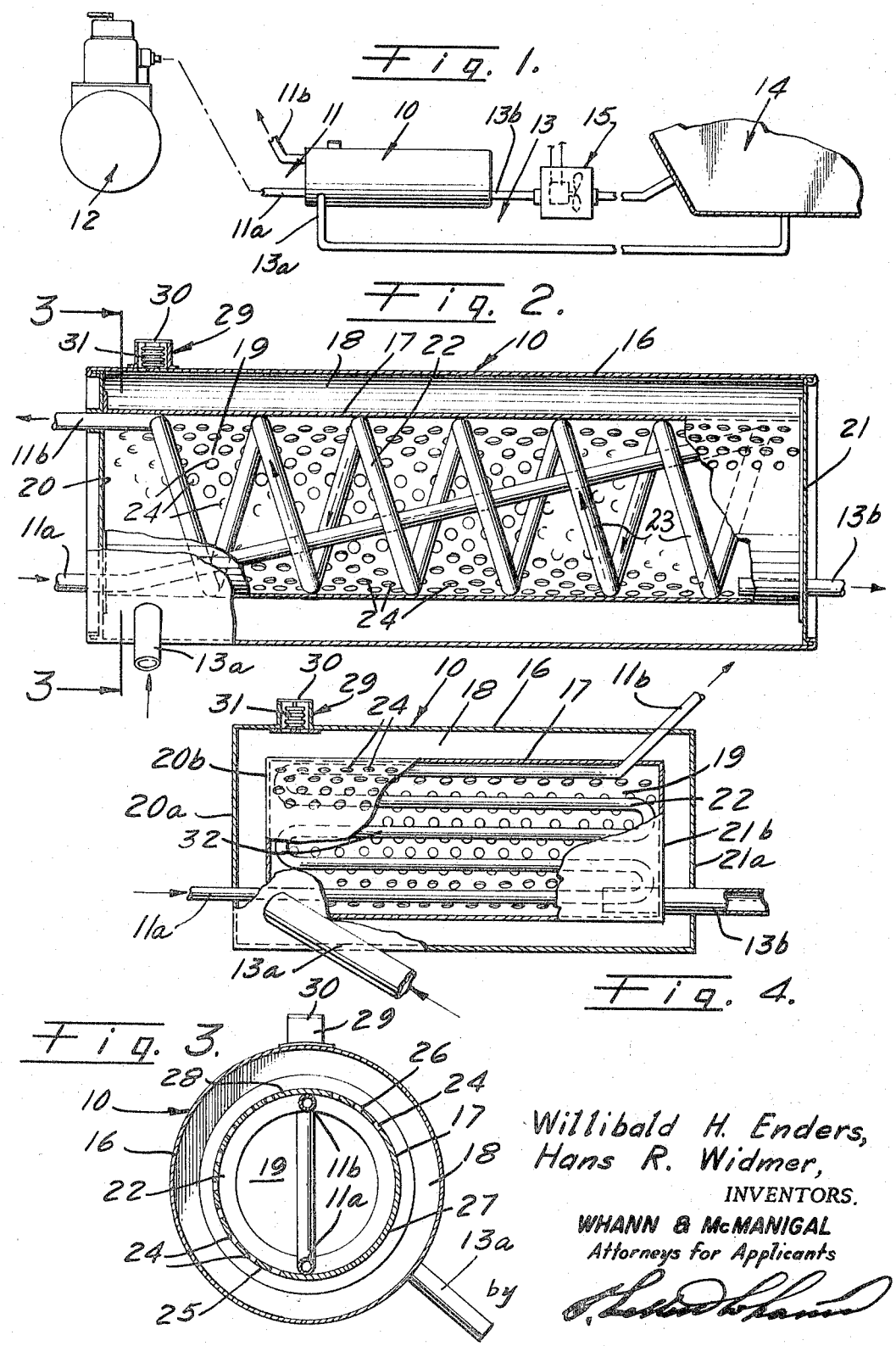

3,302,880
VEHICLE HEATER APPARATUS AND SYSTEM
Willibald Hubert Enders, 5319 Bayridge Road, Palos Verdes, Calif. 90274, and Hans R. Widmer, 1118 Mohawk St., Apt. 201–A, Los Angeles, Calif. 90026
Filed May 17, 1965, Ser. No. 456,135
7 Claims. (Cl. 237—2)

The present invention relates generally to vehicle heaters, and is more particularly concerned with heater apparatus and improved system for heating a vehicle compartment, wherein the vehicle engine is utilized as a source of heating fluid.

Hertofore, various types of heaters have been constructed wherein the exhaust gases from internal combustion engines have been utilized as a heating fluid for heating air which is conducted to a vehicle compartment. In these arrangements, the heaters have embodied structures in which heat transfer was accomplished in a relatively slow manner, and in which it was necessary to operate the system for a relatively lengthy period of time before actual heating of the compartment could be accomplished. Moreover, the heaters were so constructed that valve controls were subjected to high heat which tended to cause deterioration of the controls and necessitated either frequent replacement or repair.

In the present invention it is an object to provide an improved heater and system which will be extremely efficient in operation, has long life, and which embodies simple controls, and wherein the heating of the compartment may be accomplished quickly and effectively.

A further object is to provide a heater having a double wall structure which is so arranged that preheating of the circulatory air of the compartment will be quickly accomplished so that hot air will be quickly conducted to the compartment for heating purposes.

A further object is to provide a heater with a double wall chamber construction which utilizes a thermostatically controlled venting connection which includes a valve which is shielded by the double wall construction from the conduit carrying the heating gases from the engine, thus giving long life.

Another object is to provide an improved simplified heating system for a vehicle compartment, wherein the flow path of heated fluid is continuously supplied to the heater, and wherein heating and non-heating of the vehicle compartment is accomplished by the starting and stopping of a fluid circulating device.

Still another object of the invention is to provide in a heating system for a vehicle compartment an improved arrangement in which the heater will be maintained hot at all times, and heating of the compartment is accomplished by means of a circulating fan which will induce a flow of air into heat exchange relation with the hot gases from the engine, heating of the compartment being discontinued when the circulating fan is stopped. At such time through the action of a thermostatic air diverting device in a venting connection in the heater, further supply of heated air will be prevented due to a build up of heated air pressure in the heater apparatus. This air diverting device is arranged to close when relatively cool air is drawn into the heater, and open when there is a build up of heated air in the heater when the circulating device is not operating.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a view diagrammatically representing a vehicle heating system according to the present invention;

FIG. 2 is an enlarged side elevational view partly in cross section showing details of construction of the heater apparatus as used in the system shown in FIG. 1;

FIG. 3 is a transverse sectional view of the heater taken substantially on line 3—3 of FIG. 2; and FIG. 4 is a view similar to FIG. 2 showing details of a modified construction.

Referring more particularly to the drawings, for illustrative purposes the system of the present invention comprises generally heater apparatus 10 which operates as a heat exchanger in which a first flow path 11 is connected with an engine 12 so as to circulate hot engine exhaust gases through the heater apparatus and provide a source of heating fluid therein having heat transfer relation to a second flow path 13 for a fluid such as air which is circulated in a closed circuit through a vehicle compartment 14. The vehicle compartment 14 may comprise the passenger space of the vehicle, food compartment or other compartment of the vehicle which it is desired to heat. Circulation of fluid in the second flow path is induced by means of a fluid moving device 15 which may include a fan, pump or other suitable device for such purpose.

In order to provide for simplicity of operation, the present invention proposes to operate with the first flow path energized continuously, while circulation of heated fluid through the second flow path will be determined by starting and stopping of the fluid moving device 15. By making the fluid moving device electrically actuated, it may be easily started and stopped by a simple switching device in the energizing circuit of the motor.

As best shown in FIG. 2, the heater apparatus is disclosed as comprising a tubular double wall casing in which an outer wall 16 is in concentric spaced relation with respect to an inner wall 17, these two walls cooperating to define an annular chamber 18. The inner wall 17 thus forms a longitudinally extending inner chamber 19. The outer and inner walls 16–17 may be closed at their ends by separate end walls or as shown in FIG. 2 by a single end wall 20 at one end and end wall 21 at the opposite end.

The heated fluid of the first flow path 11 is carried through the chamber 19 in a tortuous path by means of a conduit 22 which enters the chamber at an inlet connection 11a from whence it is carried to the opposite end of the chamber adjacent end wall 21. The conduit then returns through a spiralled path formed in spiralled coils 23 to an outlet connection 11b in the same end wall 20 as the inlet connection 11a.

The second flow path is continued through the heater from an inlet connection 13a which enters the outer chamber 18 in this case adjacent the end wall 20. The fluid in the chamber 18 is then conducted through flow openings 24 into the chamber 19 where the fluid of the second flow path is brought into heat exchange relation with the heated fluid of the first flow path by contact with the conduit 23. The fluid of the second flow path exits from the chamber 19 via outlet connection 13b in the end wall 21.

As best shown in FIG. 3, the inner wall 17 has the flow openings arranged in longitudinally extending perforate areas 25 and 26 which are substantially in diametric relation and symmetrically disposed on opposite sides of imperforate areas 27 and 28 respectively arranged substantially at the bottom and top of the longitudinal chamber 19. It will thus be apparent that the fluid entering the inlet connection 13a will first impinge against the imperforate area 27 and then through divided flow pass through the perforations of perforate areas 25 and 26 from the annular chamber 18 to the longitudinal chamber 19. Moreover, flow of the entering fluid over the inner wall 17 will cause the fluid to be preheated prior to actual contact with the conduit 22 carrying the fluid which provides the heat source.

As previously stated, the present system contemplates that the source of heating fluid provided to the conduit 22 will flow continuously through the conduit so that any air of the second flow path in the chamber 19 will be heated at all times, and that movement of heated air to the vehicle compartment 14 will be dependent upon operation and non-operation of the fluid moving device 15. It will therefore be apparent that if the fluid moving device 15 is deenergized, it could be possible that heating fluid in compartment 19 could continue and eventually force heated fluid through the fluid moving device and into the vehicle compartment, even though the fluid moving device 15 is shut down. In order to prevent this, an automatic thermostatic venting connection 29 is provided which includes a valve member 30 that is actuated by a suitable thermostatic element 31 of conventional construction, and being responsive to the temperature of fluid in the annular chamber portion 18 of the second flow path. Now, when the temperature becomes relatively high in the chamber 18, the valve 30 will open and thus vent the chamber to the exterior of the heater casing and prevent forced circulation through the vehicle compartment 14, when the fluid moving device is shut down.

Now, it will be appreciated that when it is desired to circulate heated fluid through the vehicle compartment 14, it is only necessary to start up the fluid moving device 15. Immediately heated fluid in the compartment 19 is conducted to the vehicle compartment 14, and as the cooler fluid is returned from the vehicle compartment into the chamber 18, this relatively lowered temperature will act upon the thermostatic element 31 so as to close the valve 30 and thus close the venting connection 29, whereupon the heater will function in its usual manner.

It will be observed that the inner wall 17 forms a baffle between the high temperature conduit 22 and the thermostatic venting connection, and in particular this wall protects the thermostatic element and valve member from the direct heat from hot conduit 22, so that these elements will have long life and not deteriorate rapidly or have to be replaced or repaired after relatively short periods of use.

In FIG. 4, there is shown a modified construction of the heater apparatus in which like parts have been indicated by similar numerals. The modified construction is similar in operation to that shown in FIG. 2. In the modified structure, instead of utilizing single end walls, separate end walls 20a and 21a have been provided for the outer wall 16, whereas end walls 20b and 21b have been provided for the inner wall 17.

In the modified version, the conduit 22 is in this case carried through a tortuous path that includes a series of reversed loops 32 which longitudinally traverse the chamber 19 and are arranged around the inner periphery of the wall 17. In this arrangement, the outlet connection 11b is at the opposite end of the casing from the inlet connection 11a.

Various modifications may suggest themselves to those skilled in the art without departing from the spirit of our invention, and, hence, we do not wish to be restricted to the specific form shown or uses mentioned, except to the extent indicated in the appended claims.

We claim:
1. A heater for a compartment of a vehicle powered with an engine providing a source of heating fluid, said heater comprising:
 (a) a tubular housing having an outer chamber and an inner chamber connected by flow openings in a separating wall;
 (b) a conduit for conducting heating fluid from said engine in a tortuous path through said inner chamber;
 (c) an inlet connected to said outer chamber for air to be heated;
 (d) an outlet from said inner chamber for heated air;
 (e) a vent connection with said outer chamber; and
 (f) valving means in said vent connection operable to opened and closed positions in response to variations of temperature of air in said outer chamber.

2. A heater for a compartment of a vehicle powered with an engine providing a source of heating fluid, said heater comprising:
 (a) a tubular housing having an outer chamber and an inner chamber connected by flow openings in a separating wall;
 (b) a conduit for conducting heating fluid from said engine in a tortuous path through said inner chamber;
 (c) an inlet connected to said outer chamber for air
 (d) an outlet from said inner chamber for heated air; and
 (e) controlled venting means for said outer chamber including a thermostatic valve operable to closed position when the air in said outer chamber is at a predetermined relatively low temperature, and opened position when the air in said outer chamber is at a predetermined relatively high temperature.

3. A heater for a compartment of a vehicle powered with an engine providing a source of heating fluid, said heater comprising:
 (a) a housing having a tubular outer wall and tubular inner wall in concentric spaced relation defining an annular outer chamber and a longitudinally extending inner chamber, each of said chambers having closed ends, and said inner wall having longitudinally extending perforate areas on its opposite sides separated by top and bottom non-perforate areas;
 (b) a conduit for conducting heating fluid from said engine in a tortuous path through said inner chamber;
 (c) an inlet for admitting air to said outer chamber adjacent the bottom non-perforate area, whereby the admitted air will be preheated prior to passage into the inner chamber;
 (d) an outlet from said inner chamber for heated air; and
 (e) a thermostatically controlled vent connection to said outer chamber adjacent the top non-perforate area.

4. A heating system for a vehicle compartment, utilizing hot engine exhaust gases, comprising:
 (a) means for conducting hot engine exhaust gases through a first flow path;
 (b) means for conducting air through a second flow path including a vehicle compartment to be heated;
 (c) heater means for bringing the air in the second flow path into heat exchange relation with the hot exhaust gases in the first flow path prior to reaching the vehicle compartment;
 (d) means operable to induce flow of air through said second flow path; and
 (e) temperature responsive means at said heater operable to connect and disconnect said second flow path with respect to an air diverting flow path in accordance with the non-operation and operation of the flow inducing means.

5. A heating system for a vehicle compartment, utilizing hot engine exhaust gases, comprising:
 (a) means for conducting hot engine exhaust gases through a first flow path;
 (b) means for conducting air through a second flow path including a vehicle compartment to be heated;
 (c) a heater having a chamber forming a part of the second flow path in which the air is carried into heat transfer relation with exhaust gases for the first flow path at a point upstream of the vehicle compartment;

(d) means in said second flow path operable to induce flow of air in said second flow path through said heater and to said compartment; and (e) means responsive to changes in the temperature of air in said heater chamber operable to connect and disconnect said chamber with respect to an air diverting flow path.

6. A heating system for a vehicle compartment, utilizing hot engine exhaust gases, comprising:

(a) means for conducting hot engine exhaust gases through a first flow path;

(b) means for conducting air through a second flow path including a vehicle compartment to be heated;

(c) a heater having flow connected outer and inner chambers in said second flow path, the outer chamber being connected with an air inlet and the inner chamber being connected with an air outlet, and the air in said inner chamber being in heat transfer relation to the exhaust gases flowing in said first flow path;

(d) means operable to circulate air in the second flow path through said heater and to said compartment; and (e) controlled venting means for said outer chamber including a thermostatic valve operable to closed position when the air in said outer chamber is at a relatively low temperature, and opened position when the air in said outer chamber is at a relatively higher temperature.

7. A heater for a compartment of a vehicle powered with an engine providing a source of heating fluid, said heater comprising:

(a) a housing having a tubular outer wall defining a chamber;

(b) a conduit for conducting heating fluid from said engine in a tortuous path through said chamber;

(c) an inlet to said chamber for admitting air to be heated into heat exchange relation with said conduit;

(d) an outlet from said chamber for heated air; and (e) a thermostatically controlled outlet connection with an upper part of said chamber operable in response to temperature variations in said chamber.

References Cited by the Examiner
UNITED STATES PATENTS

| | | | |
|---|---|---|---|
| 1,715,630 | 6/1929 | Snell. | |
| 1,979,975 | 11/1934 | Maniscalco | 165—160 |
| 2,039,066 | 4/1936 | De Weese | 165—163 |
| 2,655,350 | 10/1953 | Gaylord | 165—162 X |

EDWARD J. MICHAEL, *Primary Examiner.*

UNITED STATES PATENT OFFICE
CERTIFICATE OF CORRECTION

Patent No. 3,302,880                              February 7, 1967

Willibald Hubert Enders et al.

It is hereby certified that error appears in the above numbered patent requiring correction and that the said Letters Patent should read as corrected below.

Column 4, line 15, after "air" insert -- to be heated; --.

Signed and sealed this 17th day of October 1967.

(SEAL)
Attest:

Edward M. Fletcher, Jr.                        EDWARD J. BRENNER

Attesting Officer                              Commissioner of Patents